(12) United States Patent
Jeong et al.

(10) Patent No.: US 9,772,069 B2
(45) Date of Patent: Sep. 26, 2017

(54) ELECTRO-MECHANOLUMINESCENT FILM AND METHOD OF MANUFACTURING THE SAME

(71) Applicant: Daegu Gyeongbuk Institute of Science and Technology, Daegu (KR)

(72) Inventors: Soon Moon Jeong, Daegu (KR); Seong Kyu Song, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 15/264,077

(22) Filed: Sep. 13, 2016

(65) Prior Publication Data
US 2017/0082247 A1  Mar. 23, 2017

(30) Foreign Application Priority Data

Sep. 18, 2015 (KR) .................. 10-2015-0132514

(51) Int. Cl.
| | | |
|---|---|---|
| *F21K 2/00* | (2006.01) | |
| *H05B 33/14* | (2006.01) | |
| *H05B 33/26* | (2006.01) | |
| *H05B 33/10* | (2006.01) | |
| *B05D 1/00* | (2006.01) | |

(Continued)

(52) U.S. Cl.
CPC ............ *F21K 2/00* (2013.01); *B05D 1/005* (2013.01); *C09K 11/02* (2013.01); *C09K 11/565* (2013.01); *H05B 33/10* (2013.01); *H05B 33/14* (2013.01); *H05B 33/26* (2013.01)

(58) Field of Classification Search
CPC ........ H05B 33/14; H05B 33/26; H05B 33/10; F21K 2/00; C09K 11/565; C09K 11/02; H05D 1/005
See application file for complete search history.

(56) References Cited

U.S. PATENT DOCUMENTS

| 2004/0143183 A1 | 7/2004 | Toyoda et al. |
| 2007/0282274 A1 | 12/2007 | Chesnin |
| 2013/0056244 A1* | 3/2013 | Srinivas .................. G06F 3/041 174/250 |

FOREIGN PATENT DOCUMENTS

| JP | 2004-155885 A | 6/2004 |
| JP | 2004-215992 A | 8/2004 |
| JP | 2013-120363 A | 6/2013 |

(Continued)

*Primary Examiner* — Donald Raleigh
*Assistant Examiner* — Kevin Quarterman
(74) *Attorney, Agent, or Firm* — Sughrue Mion, PLLC

(57) ABSTRACT

Provided is an electro-mechanoluminescent (EML) film. The EML film includes an upper supporting layer including an upper PDMS layer, including PDMS to which a stress is applied, and an upper electrode layer that is formed on a bottom of the upper PDMS layer and includes the PDMS and AgNW which are mixed with each other, a lower supporting layer including a lower PDMS layer and a lower electrode layer that is formed on a top of the lower PDMS layer and includes the PDMS and the AgNW mixed with each other, and an emitting layer formed between the upper electrode layer and the lower electrode layer, the emitting layer including a mixture, where a luminescent material with metal ions doped thereon is mixed with the PDMS, and simultaneously causing ML of a first color based on the stress and EL of a second color based on the electric field.

12 Claims, 19 Drawing Sheets

(51) Int. Cl.
    *C09K 11/02*  (2006.01)
    *C09K 11/56*  (2006.01)

(56) References Cited

FOREIGN PATENT DOCUMENTS

| KR | 10-2008-0062907 A | 7/2008 |
| KR | 10-2013-140449 A | 12/2013 |
| KR | 10-2014-26959 A | 3/2014 |
| KR | 10-2014-0125116 A | 10/2014 |
| KR | 10-2014-0125907 A | 10/2014 |
| KR | 20-2015-0000695 U | 2/2015 |
| KR | 10-2015-0057099 A | 5/2015 |

* cited by examiner

Cured PDMS(X2)

10

Delamination

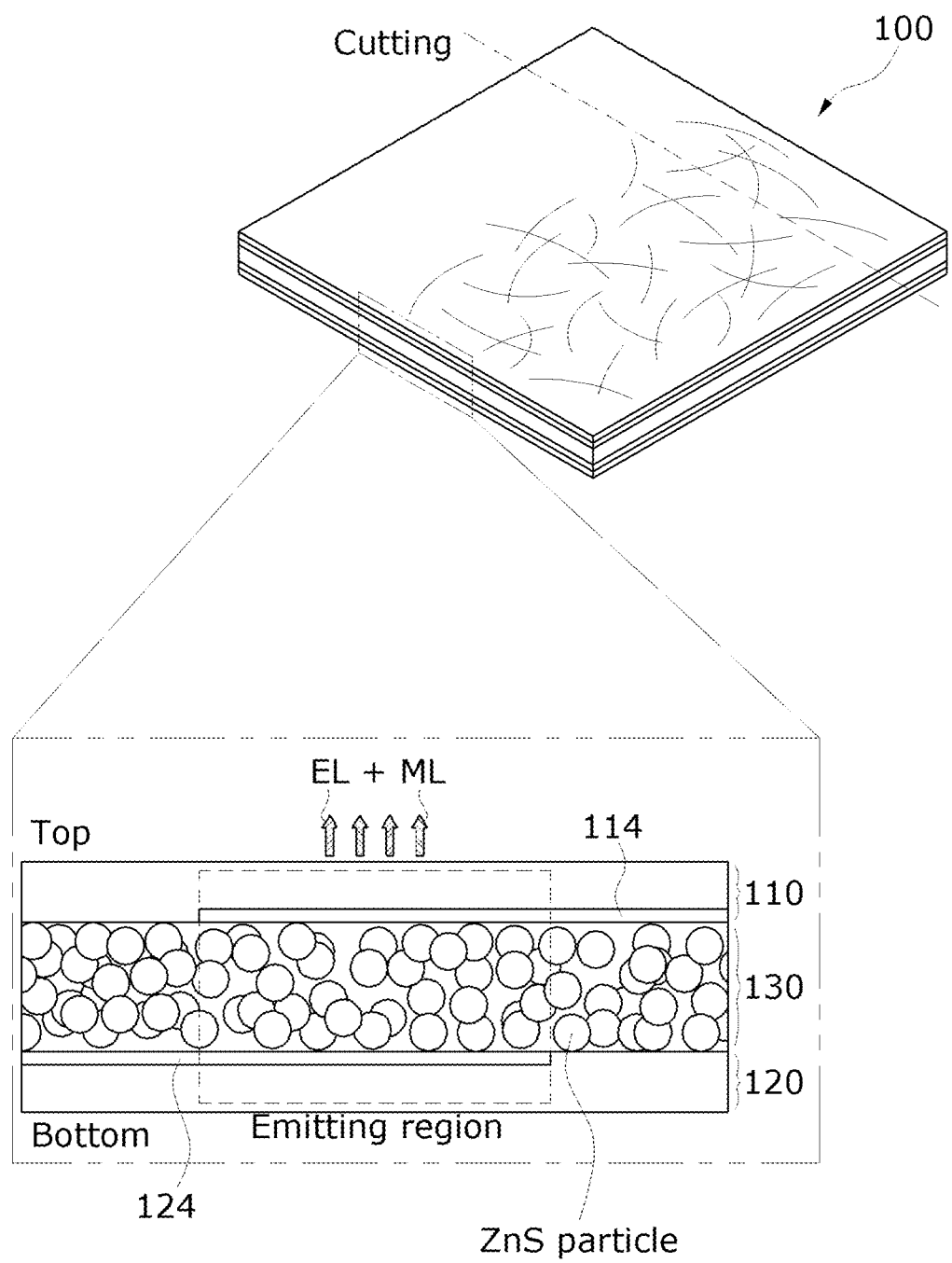

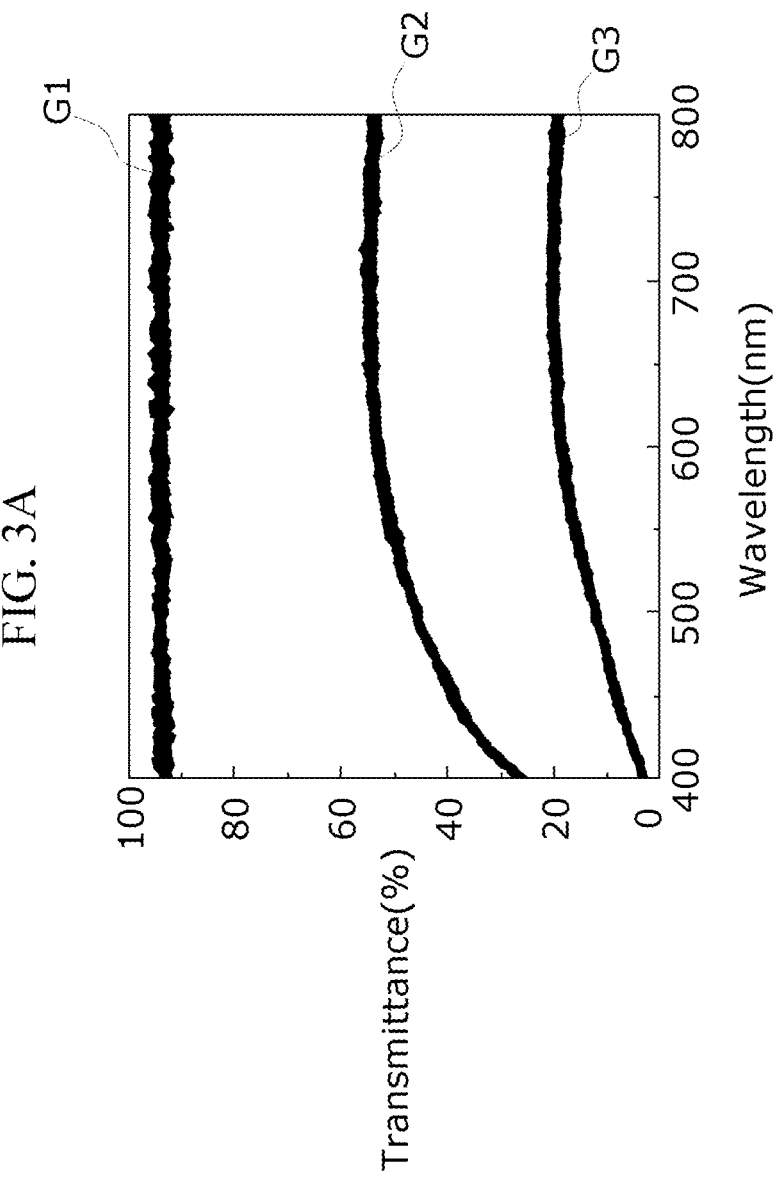

ELECTRO-MECHANOLUMINESCENT FILM AND METHOD OF MANUFACTURING THE SAME

CROSS-REFERENCE TO RELATED APPLICATIONS

This application claims priority under 35 U.S.C. §119 to Korean Patent Application No. 10-2015-0132514, filed on Sep. 18, 2015, the disclosure of which is incorporated herein by reference in its entirety.

TECHNICAL FIELD

The present invention relates to an electro-mechanoluminescent (EML) film, and more particularly, to a method of manufacturing an EML film for hybrid display which displays different colors based on an electro-deformation and mechanical deformation.

BACKGROUND

A phenomenon where light is emitted by a force applied to a material is called mechanoluminescence (ML). To date, the mechanoluminescent principle is not clearly defined and is being merely researched for scholarly interest.

Examples of the ML include emission of X-ray, which is caused by delamination of a scotch tape in a vacuum state, and emission of ultraviolet (UV) ray caused by an ultrasound wave. The ML has a fundamental problem where light is emitted due to friction or breakdown, and for this reason, is very low in industrial application possibility.

The Xu group of national institute of advanced industrial science and technology (AIST) attempted to solve a problem, where the ML is low in industrial application possibility, by applying non-destructive ML called deformation luminescence where light is emitted by elastic or plastic deformation of a material, instead of triboluminescence and fractoluminescence caused by friction or breakdown, to a stress sensor.

However, in an application attempted by the Xu group of AIST, since a general UV-curable polymer is used as a stress transfer material that transfers a mechanical force to a luminescent material for luminescence, it is difficult to transfer a repetitive stress, and consequently, a lifetime of an application product is short.

Moreover, brightness, lifetime (or reproducibility), and color control are very important factors for actually applying the ML to various industries, but there is no research on brightness, lifetime, and color control.

In order to solve such a problem, the applicant has disclosed a stress transfer material with enhanced brightness and lifetime (a mechanoluminescent composite film and a method of manufacturing the same disclosed in Korean Patent Application No. 10-2013-0042869) and has disclosed technology for controlling a luminescence spectrum based on a composite film having characteristics such as high brightness and long lifetime (a mechanoluminescent composite film for controlling color and a color control method thereof disclosed in Korean Patent Application No. 10-2013-0042870, PCT/KR2013/007545). Also, the applicant has disclosed an environment-friendly display driven by wind (a mechanoluminescent display device disclosed in Korean Patent Application No. 10-2014-0070171, PCT/KR2014/012089).

The applicant has realized ML based on a mixture where zinc sulphide (ZnS, a mechanoluminescent material) is mixed with polydimethylsiloxane (PDMS, a stress transfer material), and the mixture corresponds to a structure for realizing electroluminescence (EL). That is, in a case of using an elastic material, ML and EL are simultaneously realized.

Moreover, the mixture enables simultaneous observation of a color expression effect based on electro deformation and a color expression effect based on mechanical deformation, based on a feature where a color realized based on EL differs from a color realized based on ML, and moreover, a hybrid display based on a new concept is implemented.

However, to date, research is not sufficiently done on a luminescent material which expresses different colors by independently controlling electro-deformation and mechanical deformation to be applied to the hybrid display based on the new concept.

SUMMARY

Accordingly, the present invention provides an EML film, which expresses different colors by independently controlling electro-deformation and mechanical deformation, and a method of manufacturing the same.

In one general aspect, an electro-mechanoluminescent (EML) film includes: an upper supporting layer including an upper polydimethylsiloxane (PDMS) layer, including PDMS to which a stress based on vibration count per minute is applied, and an upper electrode layer that is formed on a bottom of the upper PDMS layer and includes the PDMS and sliver nanowires (AgNW) which are mixed with each other, an electric field being applied to the AgNW; a lower supporting layer including a lower PDMS layer, including the PDMS, and a lower electrode layer that is formed on a top of the lower PDMS layer and includes the PDMS and the AgNW which are mixed with each other; and an emitting layer formed between the upper electrode layer and the lower electrode layer, the emitting layer including a mixture, where a luminescent material with metal ions doped thereon is mixed with the PDMS, and simultaneously causing mechanoluminescence (ML) of a first color based on the stress and electroluminescence (EL) of a second color based on the electric field.

In another general aspect, a method of manufacturing an electro-mechanoluminescent (EML) film includes: (A) coating a sliver nanowires (AgNW) solution on a glass substrate by using a spin coating process, the AgNW solution including AgNW to which an electric field is applied; (B) coating polydimethylsiloxane (PDMS), to which a stress is applied, on the AgNW solution coated on the glass substrate; (C) curing the PDMS pressed by a mold apparatus to form an upper supporting layer, and delminating the upper supporting layer from the glass substrate, the upper supporting layer including an upper PDMS layer, including pure PDMS, and an upper electrode layer where the PDMS is mixed with the AgNW; (D) forming a lower supporting layer including a lower PDMS layer and a lower electrode layer through a process which is the same as steps (A), (B), and (C); and (E) curing the upper supporting layer and the lower supporting layer pressed by a pressing apparatus with a mixture, where a luminescent material with metal ions doped thereon is mixed with the PDMS, therebetween to form an emitting layer between the upper supporting layer and the lower supporting layer, the emitting layer simultaneously causing mechanoluminescence (ML) of a first color based on the stress and electroluminescence (EL) of a second color based on the electric field.

Other features and aspects will be apparent from the following detailed description, the drawings, and the claims.

BRIEF DESCRIPTION OF THE DRAWINGS

FIGS. 2A to 2F are diagrams for describing a method of manufacturing the EML film illustrated in FIG. 1.

FIG. 3A is a graph showing transmittance spectra based on a wavelength of an upper electrode layer and transmittance spectra of a lower electrode layer having a thickness thicker than that of the upper electrode layer, according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise.

An electro-mechanoluminescent according to an embodiment of the present invention may be implemented by mixing an electroluminescent material and a mechanoluminescent material fundamentally including one kind of zinc sulphide (ZnS) with polydimethylsiloxane (PDMS) acting as a stress-transferring dielectric material.

An elastic electrode may use silver nanowires (AgNW), and AgNW may be embedded into a stress transfer material (PDMS) for applying a voltage and a current despite various mechanical deformations.

Hereinafter, exemplary embodiments of the present invention will be described in detail with reference to the accompanying drawings. Moreover, detailed descriptions related to well-known functions or configurations will be ruled out in order not to unnecessarily obscure subject matters of the present invention.

Figure 1A:
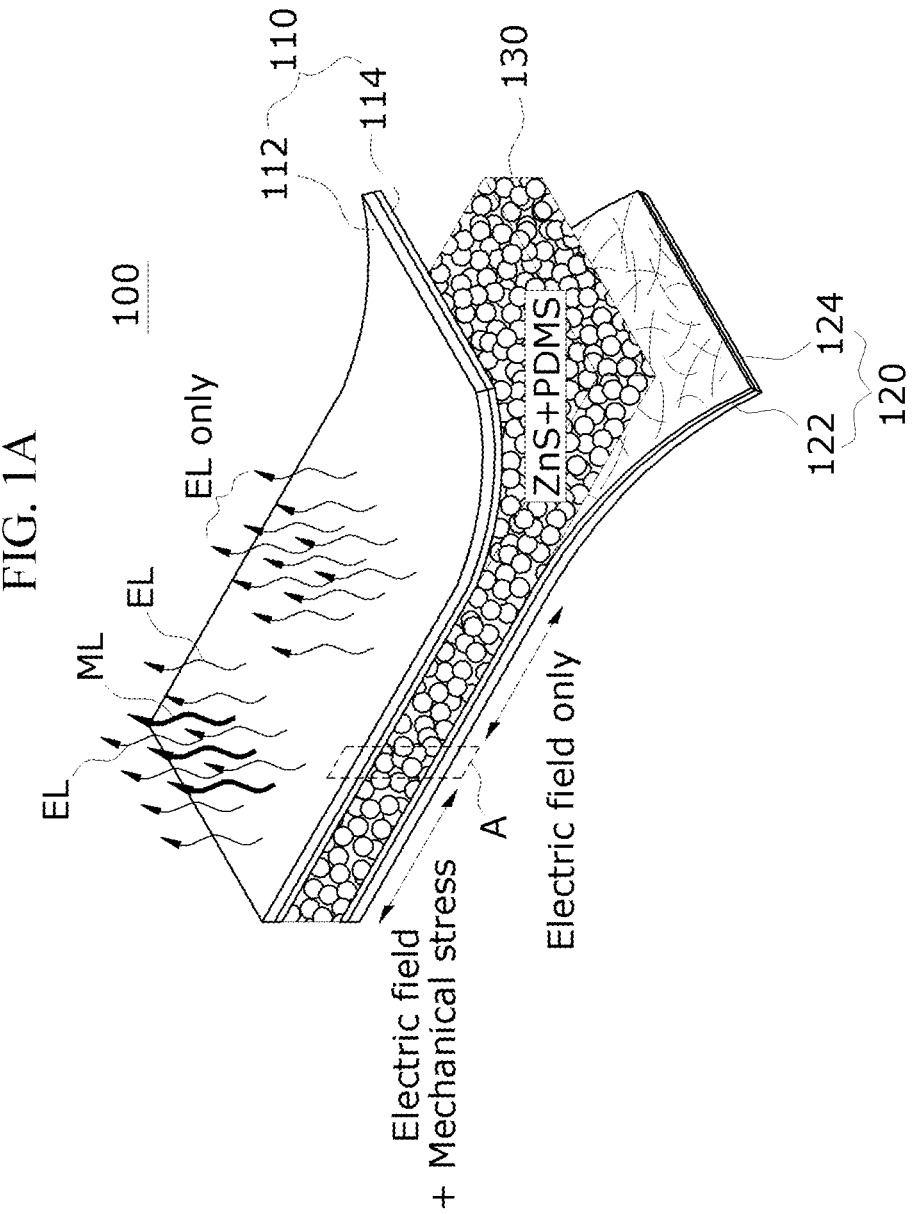
FIG. 1A is a three-dimensional cross-sectional view of an EML film applied to a hybrid display according to an embodiment of the present invention.

FIG. 1A is a three-dimensional cross-sectional view of an EML film 100 applied to a hybrid display according to an embodiment of the present invention.

Referring to FIG. 1A, the EML film 100 according to an embodiment of the present invention may include an upper supporting layer 110, a lower supporting layer 120, and an emitting layer 130.

The upper supporting layer 110 may act as a stress-transferring dielectric material.

The upper supporting layer 110 may include an upper PDMS layer 112 and an upper electrode layer 114 formed on a bottom of the upper PDMS layer 112.

The upper PDMS 112 may include pure PDMS which is the stress-transferring dielectric material.

The upper electrode layer 114 may include a material (AgNW+PDMS) where an AgNW electrode is mixed with PDMS. The upper electrode layer 114 may be referred to as AgNW-embedded PDMS.

The lower supporting layer 120 may act as a stress-transferring dielectric material.

The lower supporting layer 120 may include a lower electrode layer 124 which faces the lower PDMS layer 122 and the upper electrode layer 114 and is formed on a top of the lower PDMS layer 122.

The lower PDMS layer 122 may include pure PDMS which is a stress-transferring dielectric material.

Likewise with the upper electrode layer 114, the lower electrode layer 124 may include a material (AgNW+PDMS) where the AgNW electrode is mixed with PDMS. The lower electrode layer 124 may be referred to as AgNW-embedded PDMS.

The emitting layer 130 may be disposed between the upper supporting layer 110 and the lower supporting layer 120, and in more detail, may be disposed between the upper electrode layer 114 and the lower electrode layer 124.

Based on such an arrangement structure, the upper electrode layer 114 may form an interface between the emitting layer 130 and the upper PDMS layer 112, and the lower electrode layer 124 may form an interface between the emitting layer 130 and the lower PDMS layer 114.

The emitting layer 130 may include a material (an elastomeric "ZnS+PDMS" composite), where ZnS is mixed with PDMS, as a material capable of acting as a mechanoluminescent function and an electroluminescent function.

Figure 1B:
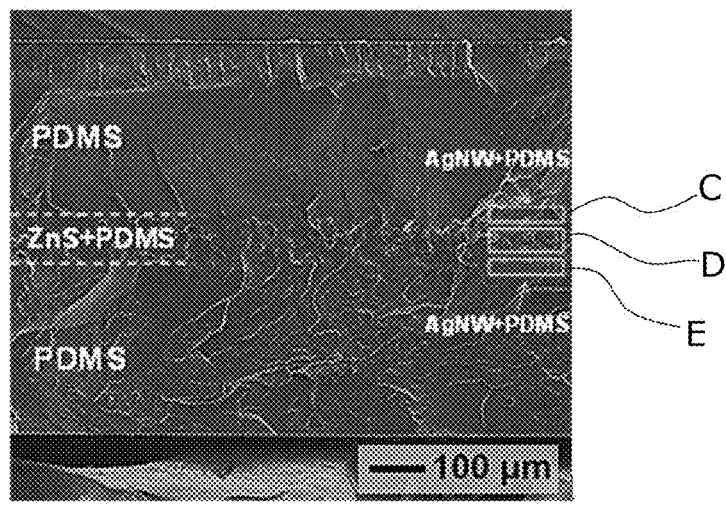
FIGS. 1B to 1E are scanning electron microscope (SEM) photographs obtained by scanning the inside of an actually manufactured EML film according to an embodiment of the present invention with an electron microscope.
Figure 1C:
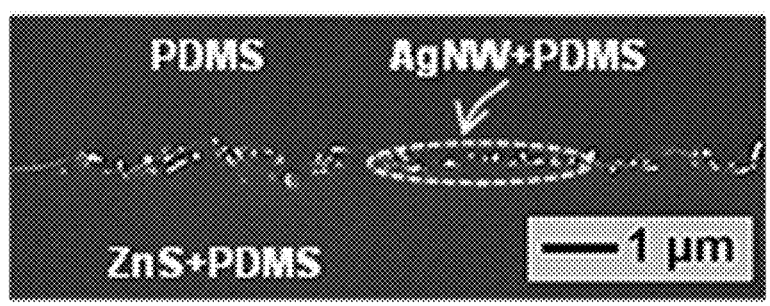
Figure 1D:
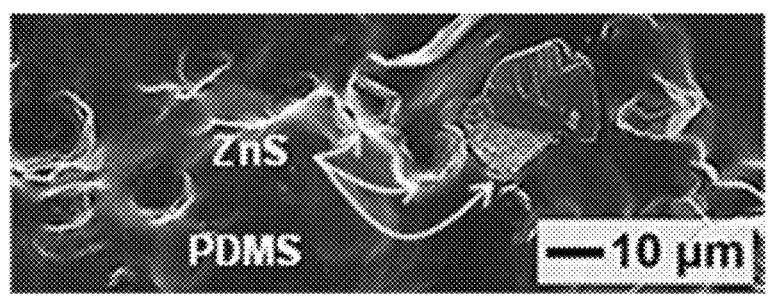

FIG. 1B is an scanning electron microscope (SEM) photograph obtained by scanning the inside of an actually manufactured EML film according to an embodiment of the present invention with an electron microscope, and for example, is an SEM photograph obtained by scanning a region A illustrated in FIG. 1A. FIG. 1C is an enlarged diagram of a region C of FIG. 1B and is an SEM photograph showing the upper electrode layer 114 forming an interface in the actually manufactured EML film according to an embodiment of the present invention. FIG. 1D is an enlarged diagram of a region D of FIG. 1B and is an SEM photograph showing the emitting layer in the actually manufactured EML film according to an embodiment of the present invention. FIG. 1D is an enlarged diagram of a region E of FIG. 1B and is an SEM photograph showing the lower electrode layer 124 forming an interface in the actually manufactured EML film according to an embodiment of the present invention.

Figure 1E:
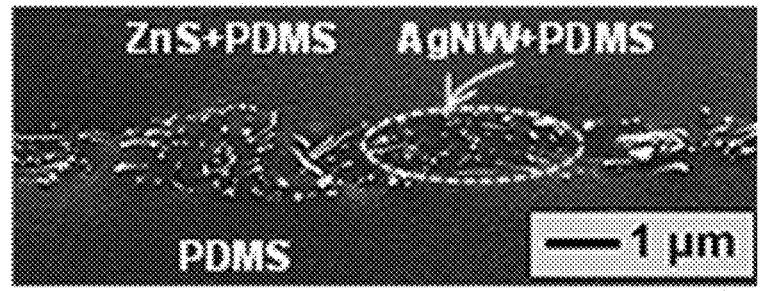

As seen in FIGS. 1C and 1E, a thickness of the upper electrode layer (AgNW+PDMS) 114 may differ from that of the lower electrode layer (AgNW+PDMS) 124. For example, the thickness of the upper electrode layer (AgNW+PDMS) 114 through which light passes may be less than that of the lower electrode layer (AgNW+PDMS) 124 through which light cannot pass.

As the thickness of each of the electrode layers 114 and 124 including an AgNW electrode becomes thicker, resistance characteristics are improved, but a transmittance is reduced. For this reason, the upper electrode layer (AgNW+PDMS) 114 through which light passes may be thinly formed, and the lower electrode layer (AgNW+PDMS) 124 through which light cannot pass may be relatively thickly formed for an electrical resistance.

FIGS. 2A to 2F are diagrams for describing a method of manufacturing the EML film illustrated in FIG. 1.

Figure 2A:
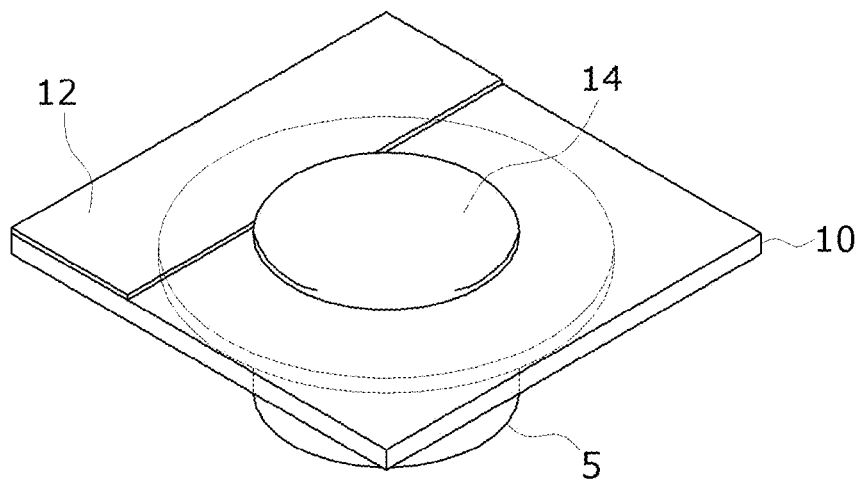

Referring to FIG. 2A, a glass substrate 10 may be provided on a spin coating apparatus 5 that performs a spin coating process. At this time, a tape 12 may be adhered to one surface of the glass substrate 10. Therefore, another surface other than the one surface of the glass substrate 10 may be exposed to above. Subsequently, an AgNW solution 14 may be dropped onto the glass substrate 10 to which the tape 12 is adhered, and then, by performing the spin coating process, AgNW may be coated on the tape 12 and the other surface of the glass substrate 10 which is exposed to above by the tape 12. Here, the AgNW solution 14 may include, for example, an ethanol solution and nanometer-unit AgNW which is uniformly diffused (spread) in the ethanol solution, and the tape 12 may be, for example, a polyimide-based tape such as a Kapton tape.

Figure 2B:
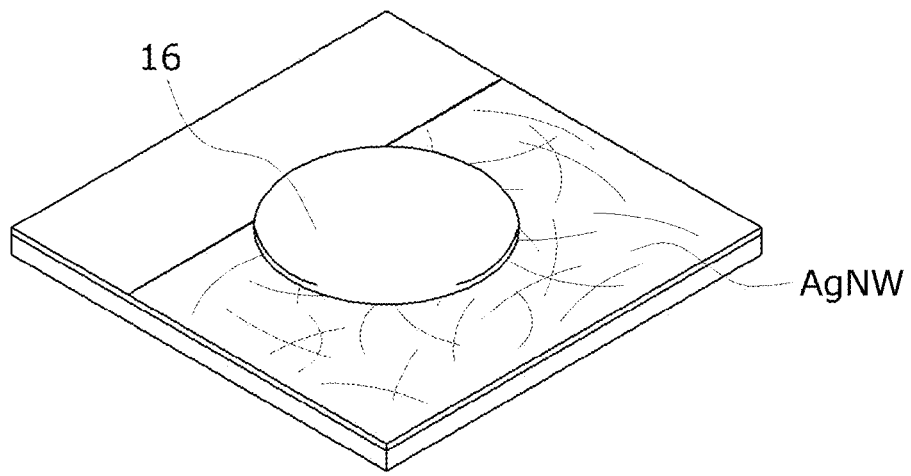

Referring to FIG. 2B, after the AgNW is coated on the glass substrate 10, a process of removing the tape 12 may be performed. The AgNW coated on the tape 12 may be delaminated along with the tape 12 in a process of delaminating the tape 12, and thus, one surface of the glass substrate 10 may be exposed to above. Pure PDMS 16 may be coated on the AgNW, which is coated on the one surface of the glass substrate 10 exposed to above and the other surface, through the spin coating process. Since an adhesive force between the AgNW and the glass substrate 10 is very weak in a state where the AgNW is simply coated on the glass substrate 10, a process of coating the pure PDMS 16 on the AgNW may be performed.

Figure 2C:
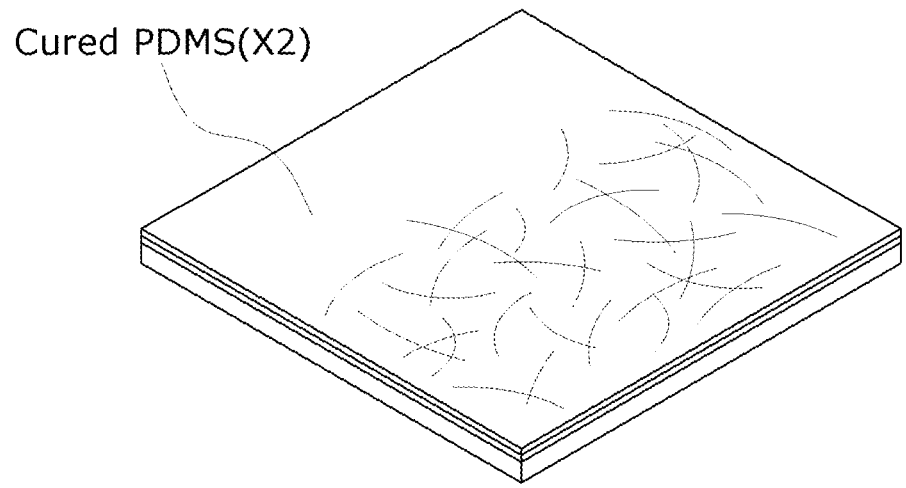

Referring to FIG. 2C, a process of curing the pure PDMS 16 may be performed for uniformly forming a thickness of the pure PDMS 16. The curing process may be performed for 35 minutes in an atmosphere of 100° C. in a state where a pressing apparatus (not shown) presses the pure PDMS 16 coated on the AgNW, and thus, the pure PDMS 16 may be cured in a state of containing the AgNW.

Figure 2D:
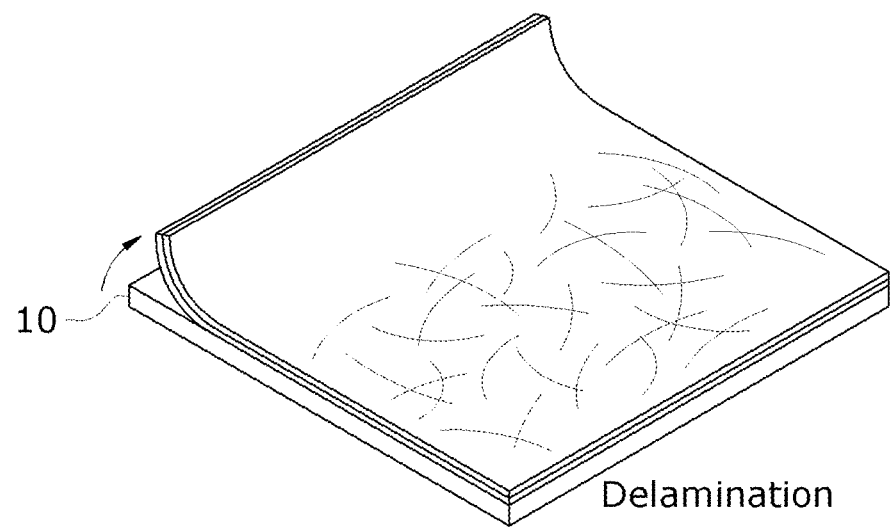

Referring to FIG. 2D, the pure PDMS 16 which is cured in a state of containing the AgNW may be delaminated from the glass substrate 10, and the pure PDMS 16 delaminated from the glass substrate 10 may be formed as the upper supporting layer 110, including the upper electrode layer (AgNW+PDMS) 114 including the AgNW, on upper PDMS (112 of FIG. 1A) and a bottom of the upper PDMS (112 of FIG. 1A) and may be formed as the lower supporting layer 120, including the lower electrode layer (AgNW+PDMS) 124 including the AgNW, on lower PDMS (122 of FIG. 1A) and a bottom of the lower PDMS (122 of FIG. 1A).

A thickness of the upper electrode layer (AgNW+PDMS) 114 and a thickness of the lower electrode layer (AgNW+PDMS) 124 may be set based on different spin coating conditions, and thus, the thickness of the upper electrode layer (AgNW+PDMS) 114 may differ from that of the lower electrode layer (AgNW+PDMS) 124. For example, if the upper electrode layer (AgNW+PDMS) 114 transmits light and the lower electrode layer (AgNW+PDMS) 124 does not transmit light, the spin coating condition for forming the upper electrode layer (AgNW+PDMS) 114 may be set to 500 rpm, and the spin coating condition for forming the lower electrode layer (AgNW+PDMS) 124 may be set to 100 rpm, whereby the thickness of the upper electrode layer (AgNW+PDMS) 114 may be formed thinner than that of the lower electrode layer (AgNW+PDMS) 124.

Figure 3B:
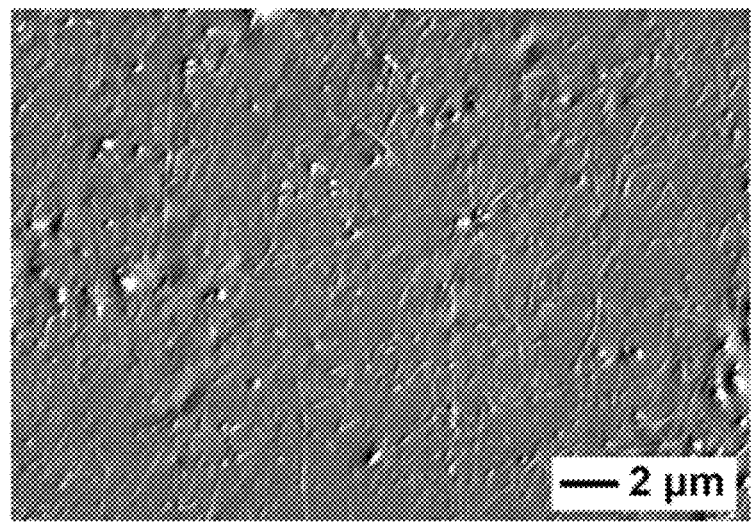
FIG. 3B is an SEM photograph of the upper electrode layer transmitting light in an actually manufactured EML film according to an embodiment of the present invention.
Figure 3C:
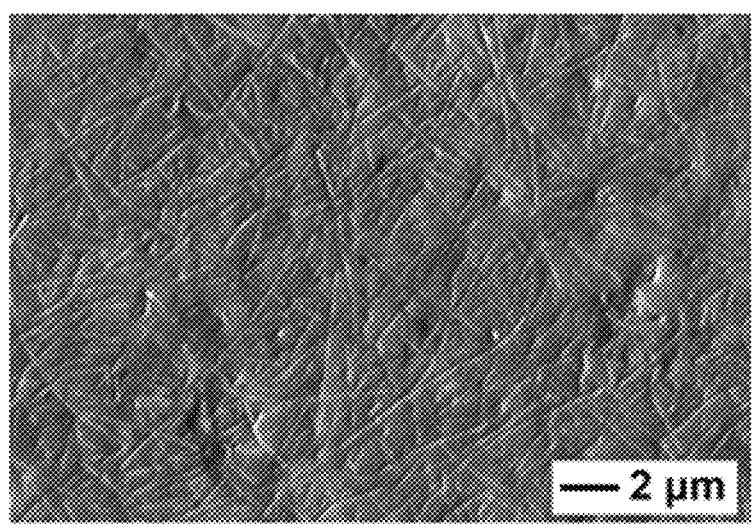
FIG. 3C is an SEM photograph of the lower electrode layer incapable of transmitting light in the actually manufactured EML film according to an embodiment of the present invention.

FIG. 3A is a graph showing transmittance spectra based on a wavelength of an upper electrode layer and transmittance spectra of a lower electrode layer having a thickness thicker than that of the upper electrode layer, according to an embodiment of the present invention. FIG. 3B is an SEM photograph of the upper electrode layer transmitting light in an actually manufactured EML film according to an embodiment of the present invention. FIG. 3C is an SEM photograph of the lower electrode layer incapable of transmitting light in the actually manufactured EML film according to an embodiment of the present invention.

In FIG. 3A, reference numeral G1 refers to a graph showing a transmittance of pure PDMS (i.e., the upper or lower PDMS layer 112 or 114), reference numeral G2 refers to a graph showing a transmittance of the upper electrode layer (AgNW+PDMS) 114 having a first thickness, and reference numeral G3 refers to a graph showing a transmittance of the lower electrode layer (AgNW+PDMS) 124 thicker than the first thickness.

Figure 2E:
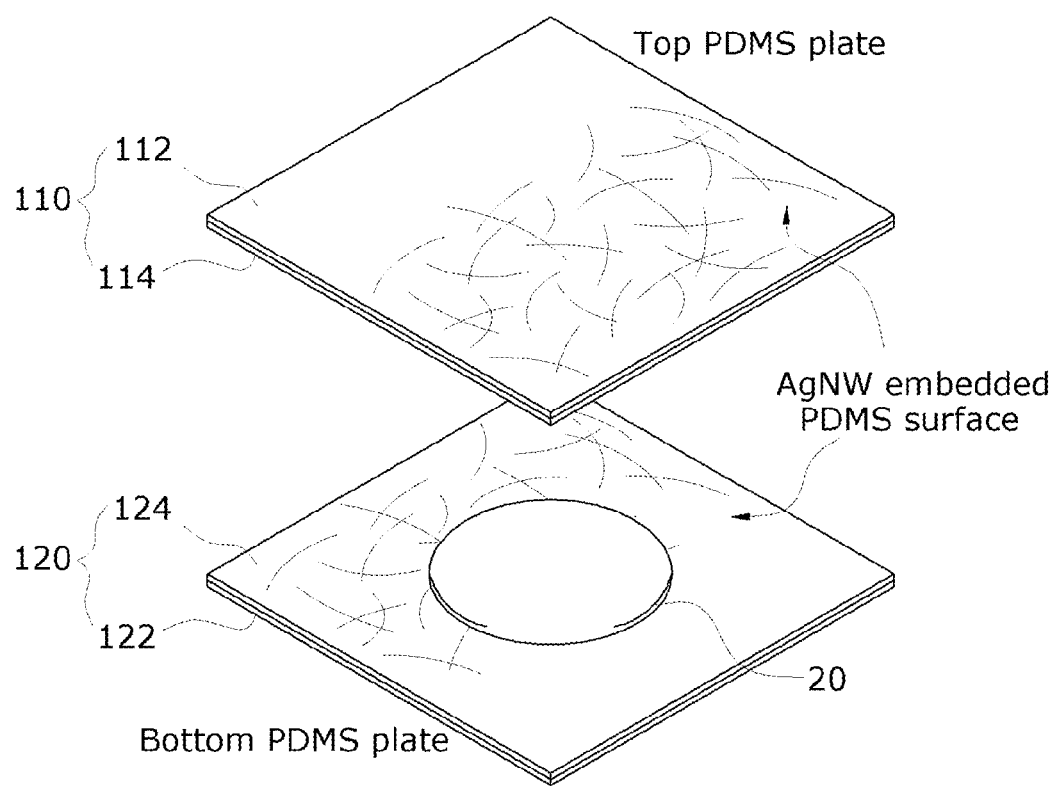

Referring to FIG. 2E, when the upper supporting layer 110 and the lower supporting layer 120 are provided through the processes of FIGS. 2A to 2D, and a mixture (ZnS+PDMS mixture) 20 where ZnS is mixed with PDMS may be prepared. The mixture 20 may include ZnS and PDMS which are mixed at a weight ratio of 7:3. Subsequently, the prepared mixture 20 may be located between the upper electrode layer 114 of the upper supporting layer 110 and the lower electrode layer 124 of the lower supporting layer 120, and the pressing apparatus (not shown) may press the upper supporting layer 110 toward the lower supporting layer 120 or may press the lower supporting layer 120 toward the upper supporting layer 110. In this state, a curing process may be performed. The emitting layer (ZnS+PDMS) 130 may be formed by curing process. The curing process may be performed for 35 minutes in an atmosphere of 100° C. FIG. 2E shows an example where the pressing apparatus presses the upper supporting layer 110 toward the lower supporting layer 120 in a state where the mixture 20 is applied onto the lower electrode layer 124 of the lower supporting layer 120.

Referring to FIG. 2F, when a film where the emitting layer (ZnS+PDMS) 130 is formed between the upper supporting layer 110 and the lower supporting layer 120 is manufactured through the curing process, the film may be cut to a desired size, and thus, an EML film 100 according to an embodiment of the present invention may be manufactured. In the manufactured EML film 100, a region where the upper electrode layer 114 overlaps the lower electrode layer 124 may be defined as an emitting region, and EL and ML simultaneously occur in the emitting region.

In an embodiment of the present invention, a luminescent material showing blue and green may use ZnS:Cu on which metal ions are doped, and a stress transfer material may use PDMS. However, the present embodiment is not limited to ZnS:Cu and an emitting color such as blue and green.

The luminescent material may use, for example, ZnS:Mn, ZnS:Cu, Mn, ZnS:Cu,Pb, ZnS:Cu,Pb, Mn, $MgF_2$:Mn, $La_2O_2S$:Eu, $Y_2O_2S$:Cu, $EuD_4TEA$, $EuD_4TEA$+1.25 mL DMMP, ZnS:Cu, Cl, ZnS:Cu, Mn, Cl, $SrAl_2O_4$:Eu, $SrAl_2O_4$:Ce, $SrAl_2O_4$:Ce,Ho, $SrMgAl_6O_{11}$:Eu, $SrCaMgSi_2O_7$:Eu, $SrBaMgSi_2O_7$:Eu, $Sr_2MgSi_2O_7$:Eu, $Ca_2MgSi_2O_7$:Eu, Dy, $CaYAl_3O_7$:Eu(Ba, Ca), $TiO_3$:$Pr_3$+, $ZnGa_2O_4$:Mn, $MgGa_2O_4$:Mn, $Ca_2Al_2SiO_7$:Ce, $ZrO_2$:Ti, ZnS:Mn, Te, and a combination thereof.

An organic material (which acts as a stress transfer material and a dielectric material) may include, for example, a material including polydimethylsiloxane and polyurethane which are optically transparent (a transmittance is 80% or more in a visible light region) and are elastic, or may include silicon rubber or UV-curable epoxy which is strong in durability.

FIGS. 4A to 4H are graphs showing electro-optical characteristics of an EML film which is manufactured to have excellent EL, according to an embodiment of the present invention and are graphs showing electro-optical characteristics when an emitting layer is formed to a thickness of 90 μm so that EL is better than ML.

Figure 4A:
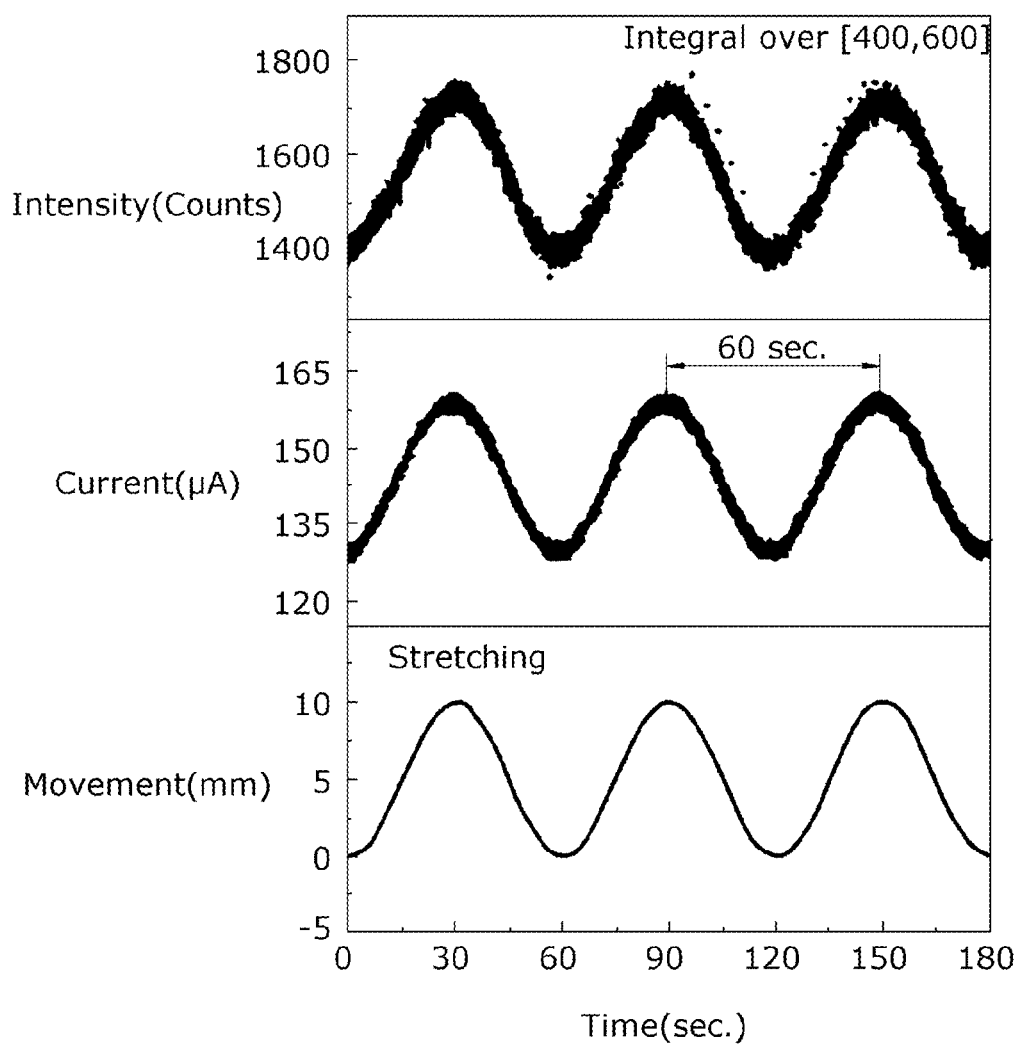
FIGS. 4A to 4H are graphs showing electro-optical characteristics of an EML film which is manufactured to have excellent EL, according to an embodiment of the present invention.

The graphs of FIG. 4A are graphs light intensity (counts), a current (μA), and a stretched distance (movement, mm) when an electric field is continuously applied to an EML film according to an embodiment of the present invention, and simultaneously, each of a stretching force and a releasing force is applied to the EML film according to an embodiment of the present invention at a velocity of 1 cpm (cycles/min, vibration count per minute) by using a specific apparatus.

Figure 4B:
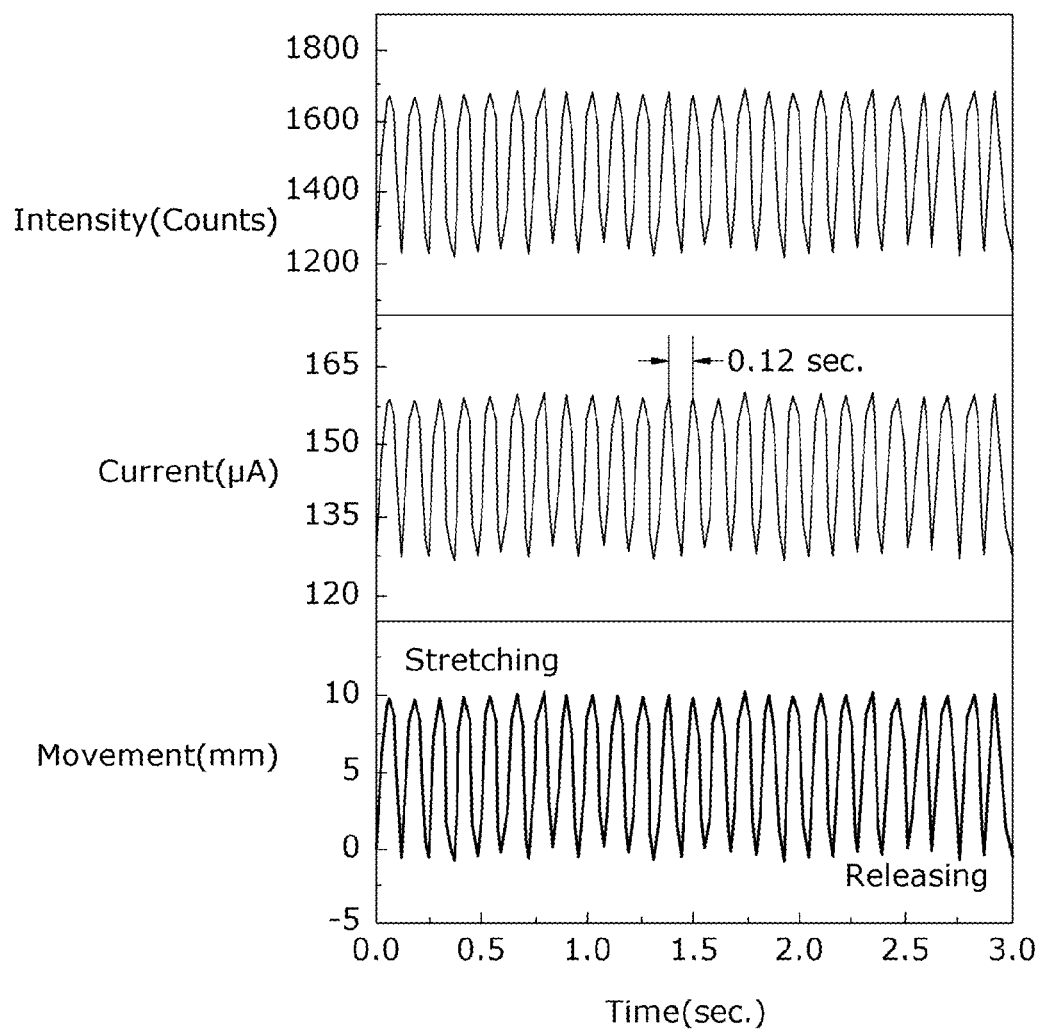

The graphs of FIG. 4B are graphs light intensity (counts), a level of a current (μA), and a stretched distance (movement, mm) when an electric field is continuously applied to the EML film according to an embodiment of the present invention, and simultaneously, each of a stretching force and a releasing force is applied to the EML film at a velocity of 500 cpm.

In FIGS. 4A and 4B, it can be seen that a level of a current and light intensity are represented as a stretched distance represented as a cosine function and a cosine function having the same period. That is, it can be seen that as the stretched distance increases, the level of the current and the light intensity increase. The reason that the level of the current and the light intensity increase as the stretched distance increases is because a thickness of an emitting layer (ZnS+PDMS) is reduced as the EML film according to an embodiment of the present invention is stretched.

Figure 4C:
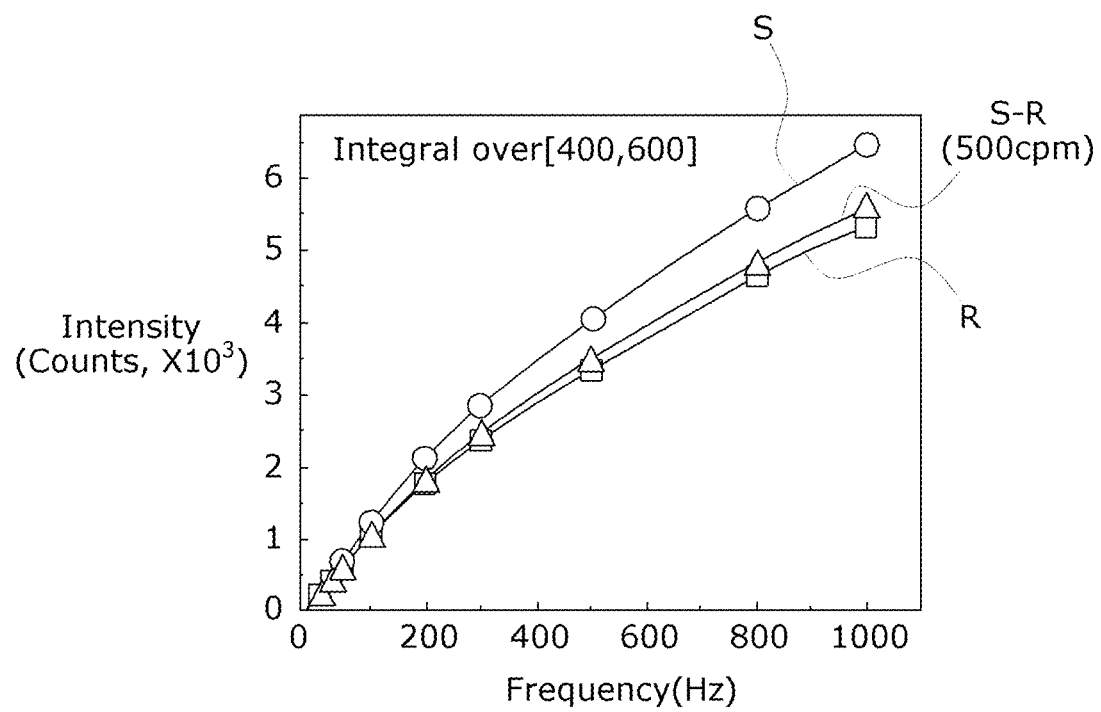

FIG. 4C shows graphs S, R and S-R showing intensity changes of light with respect to a frequency in a state where the EML film according to an embodiment of the present invention is released, a state where the EML is stretched, and a state where the EML is repeatedly stretched and released at a velocity of 500 cpm (cycles/min). In FIG. 4C, reference numeral S is an abbreviation of stretched, and reference numeral R is an abbreviation of released.

Figure 4D:
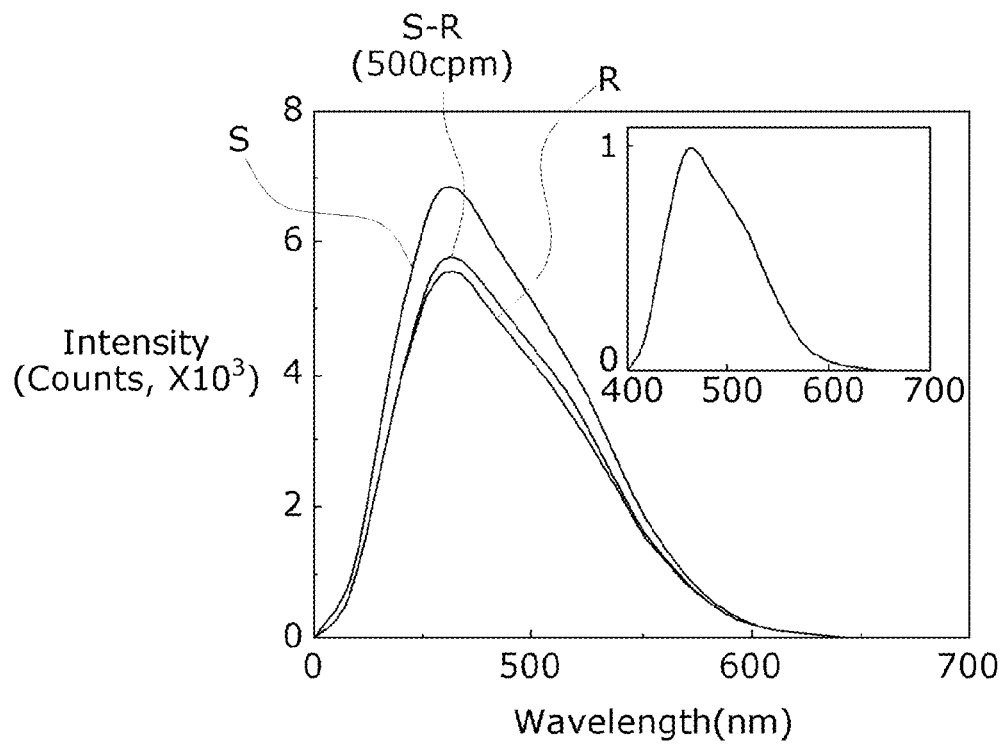

FIG. 4D shows graphs S, R and S-R showing intensity changes of light with respect to a wavelength in a state where the EML film according to an embodiment of the present invention is released, a state where the EML is stretched, and a state where the EML is repeatedly stretched and released at a velocity of 500 cpm (cycles/min).

Figure 4E:
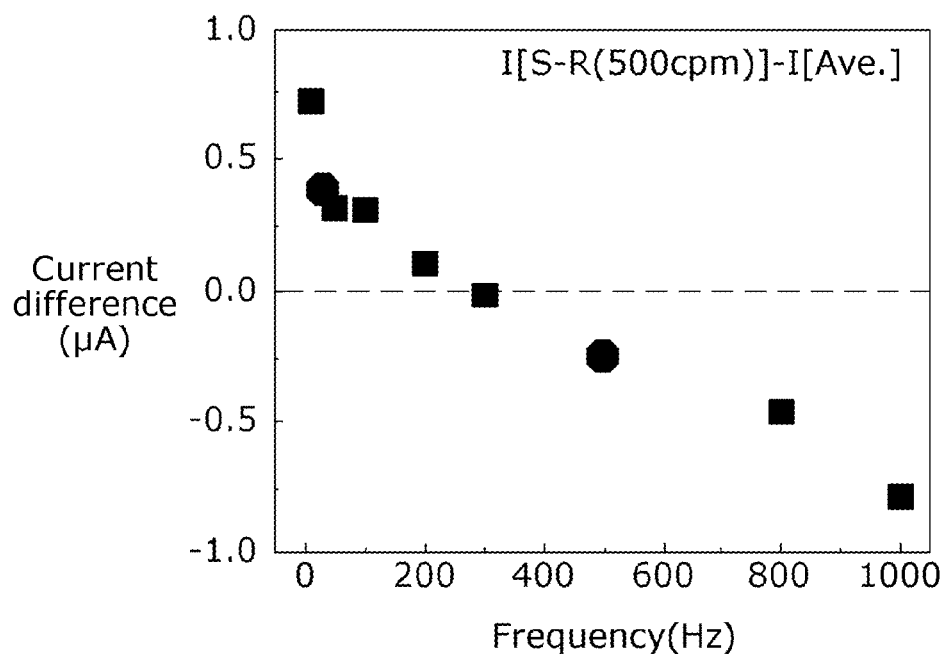

FIG. 4E shows graphs S, R and S-R showing changes in a current with respect to a frequency in a state where the EML film according to an embodiment of the present invention is released, a state where the EML is stretched, and a state where the EML is repeatedly stretched and released at a velocity of 500 cpm (cycles/min).

In FIGS. 4C and 4D, it is expected that light intensity shown in a state where the EML according to an embodiment of the present invention is repeatedly stretched and released has an intermediate value between light intensity in a state where the EML film is released and light intensity in a state where the EML is stretched, but as an actual result, as shown in FIGS. 4C and 4D, light intensity shown in a state where the EML is repeatedly stretched and released is close to light intensity in a state where the EML film is released. Through such a reason, it can be considered that ZnS particles unstably move in PSMS due to deformation caused by the stretch and release of the EML film. Another reason can be based on a movement of AgNW caused by deformation of the EML film.

FIG. 4E is a graph showing a current difference value (μA) between a mean current value (a mean current value between a value of a current flowing in the EML film in a released state and a value of a current flowing in the EML film in a stretched state) and a value of a current which flows in the EML film in a state where the EML film is repeatedly stretched and released at a velocity of 500 cpm. Here, the reason that the current difference value (μA) is high in a low frequency region is because of a leaked current, and the reason that the current difference value (μA) is lowered as a frequency increases is because an AgNW resistance increases.

Figure 4F:
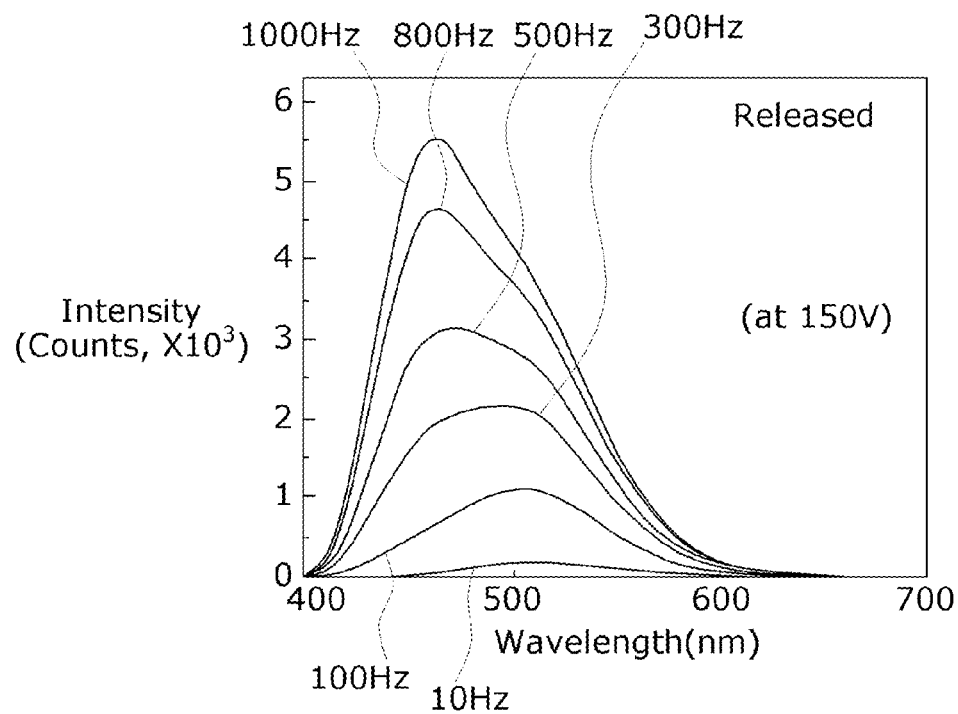
Figure 4G:
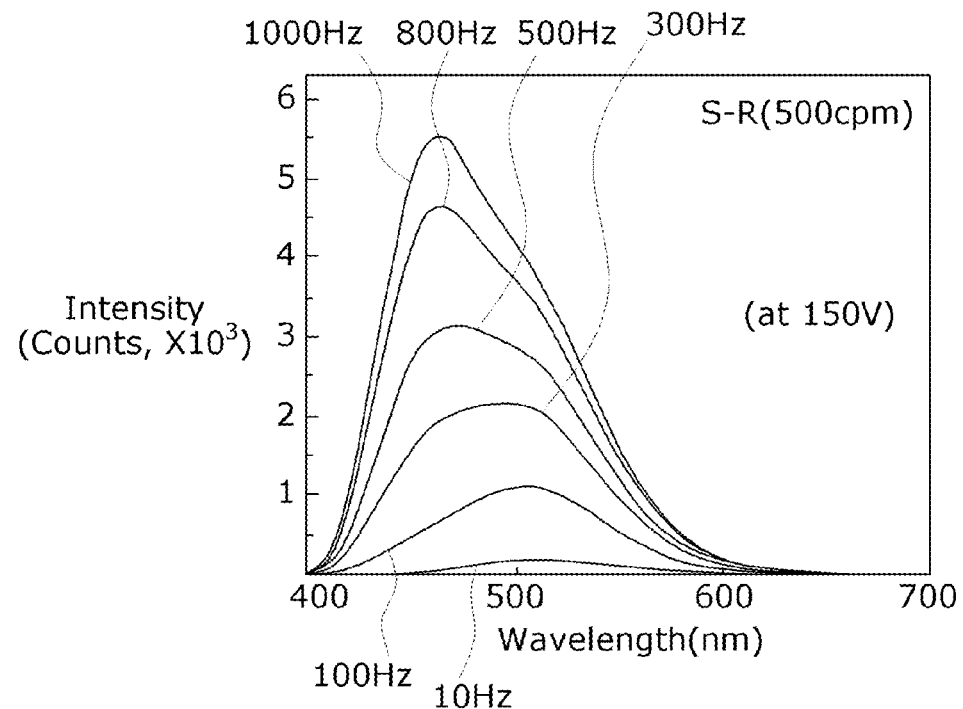
Figure 4H:
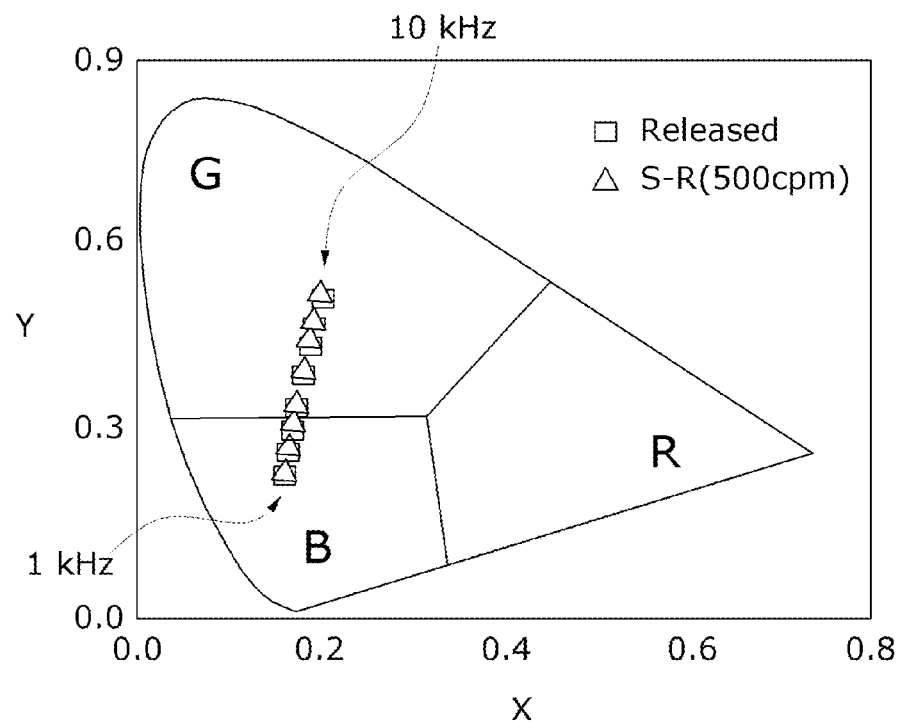

FIGS. 4F and 4G are graphs showing frequency-based spectra in a state where the EML film according to an embodiment of the present invention is released, and FIG. 4H is a graph showing frequency-based spectra in a state where the EML film according to an embodiment of the present invention is repeatedly stretched and released.

Referring to FIGS. 4F and 4G, a luminescent material (ZnS) applied to the present embodiment may fundamentally include an emitting center that contributes to emission of green and emission of blue, and as a frequency becomes higher, spectra progressively change from green to blue. That is, the spectra change from a high wavelength band to a low wavelength band.

As in the present embodiment, a structure where a thickness of the emitting layer of the EML film is set to 90 μm is a structure where EL is excellent, and in the structure, brightness of ML is low.

Due to the low brightness of ML, whole luminescence of the EML film according to an embodiment of the present invention mostly contributes to EL. For this reason, it can be seen that changes in a color coordinate value of FIG. 4H and spectrum changes caused by wavelength changes of FIGS. 4F and 4G show a similar aspect.

Figure 5A:
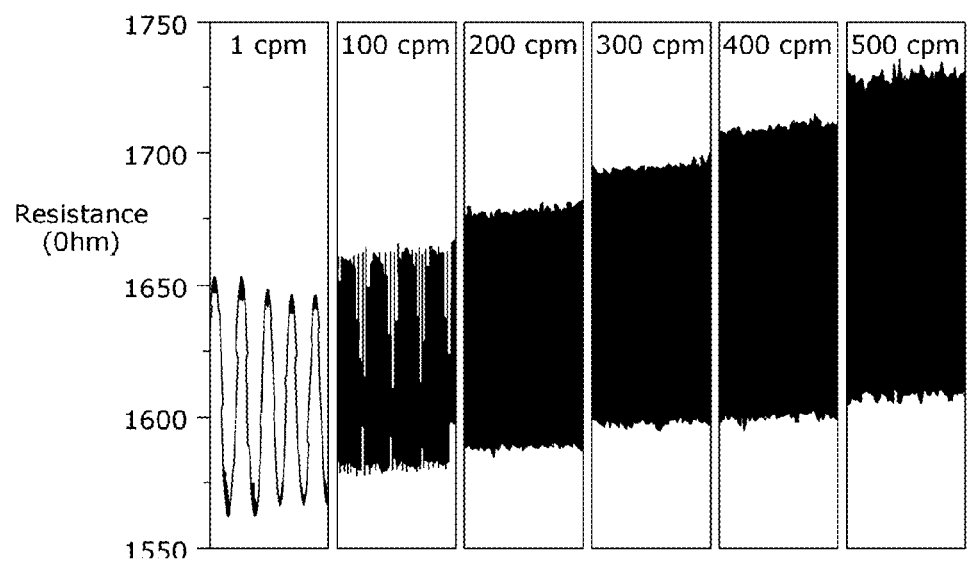
FIGS. 5A and 5B are graphs showing results obtained by measuring resistance changes of an AgNW electrode disposed between upper PDMS and lower PDMS according to an embodiment of the present invention.
Figure 5B:
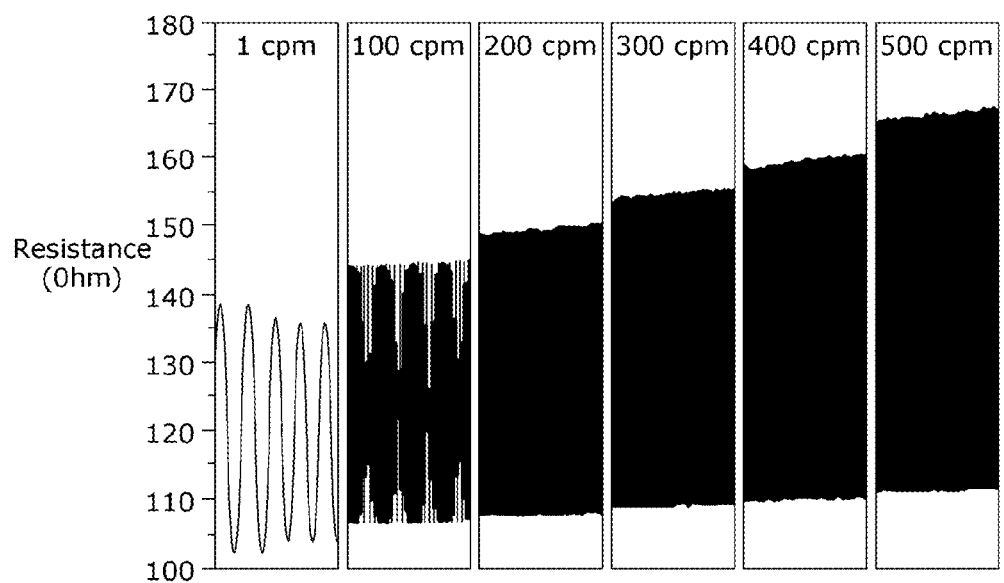

FIGS. 5A and 5B are graphs showing results obtained by measuring resistance changes of an AgNW electrode disposed between upper PDMS and lower PDMS according to an embodiment of the present invention. FIG. 5A shows a result obtained by measuring resistance changes of an AgNW electrode (an upper electrode layer) disposed on an upper PDMS layer, and FIG. 5B shows a result obtained by measuring resistance changes of an AgNW electrode (a lower electrode layer) disposed on a lower PDMS layer.

As illustrated in FIGS. 5A and 5B, it can be seen that as a velocity at which the EML film according to an embodiment of the present invention is repeatedly stretched and released increases (or becomes faster) in the order of 1 cpm, 100 cpm, 200 cpm, 300 cpm, 400 cpm, and 500 cpm, a whole resistance increases.

FIGS. 6A to 6G are graphs showing electro-optical characteristics of an EML film which is manufactured to have a structure having ML better than EL, according to an embodiment of the present invention and are graphs showing electro-optical characteristics of an EML film where a thickness of an emitting layer is set to 150 µm so that ML is better than EL.

Figure 6A:
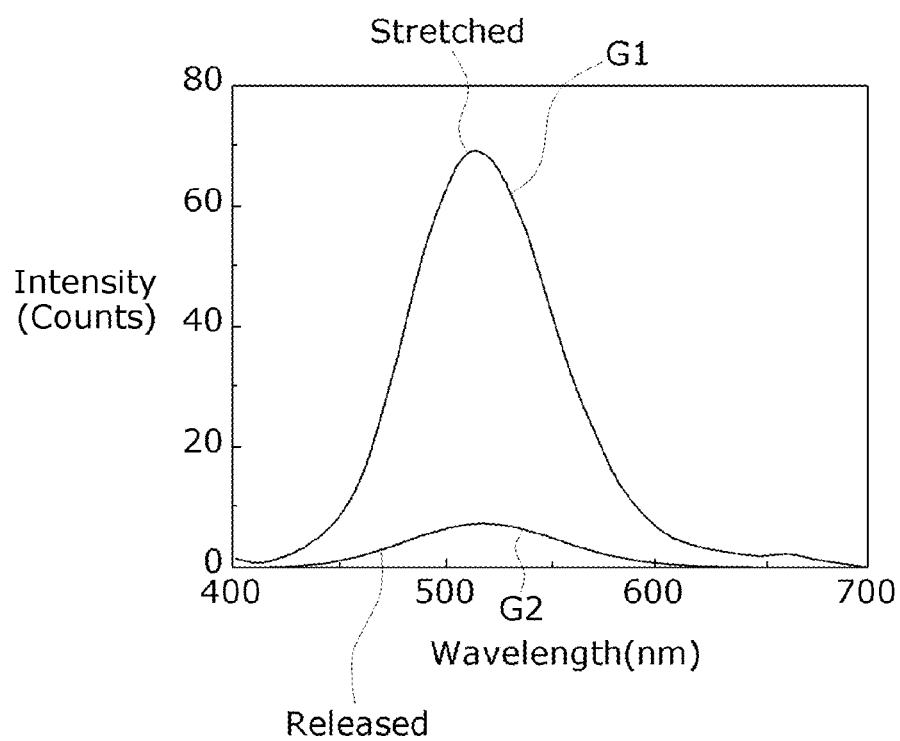
FIGS. 6A to 6G are graphs showing electro-optical characteristics of an EML film which is manufactured to have a structure having ML better than EL, according to an embodiment of the present invention.

Referring to FIG. 6A, reference numeral G1 refers to a graph showing light intensity changes of ML with respect to a wavelength, and reference numeral G2 refers to a graph showing light intensity changes of EL with respect to a wavelength. In an EML film, it can be seen through the graphs G1 and G2 that as ZnS particles increase, light intensity of ML increases, and as an electric field is weakened due to an increase in thickness, light intensity of EL is reduced.

Figure 6B:
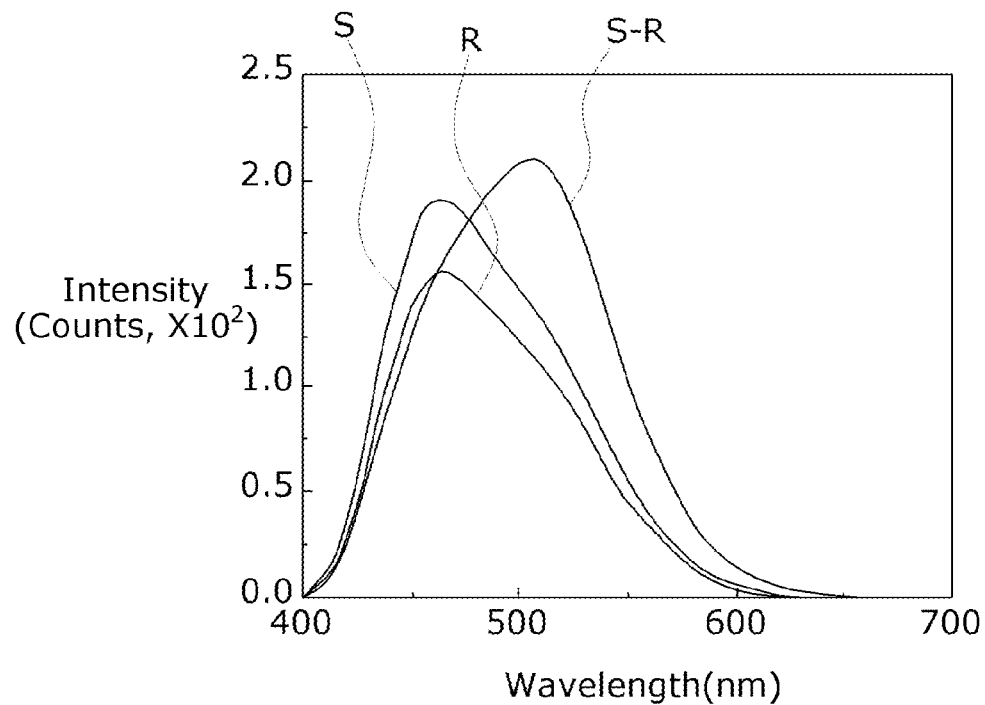

Referring to FIG. 6B, it can be seen through a graph S-R that when an EML film manufactured to have excellent ML according to an embodiment of the present invention is repeatedly stretched and released, a peak value of light intensity is located in a wavelength band where green is strongly shown in comparison with EL. Therefore, it can be seen that mechanical deformation is a trigger causing a color change.

Figure 6C:
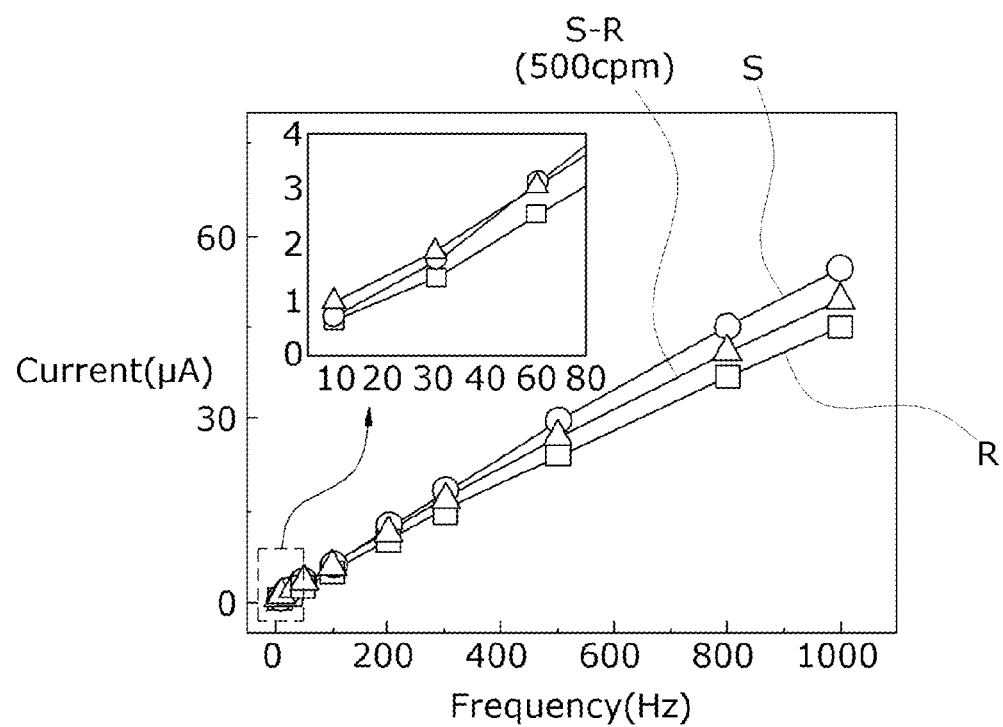

FIG. 6C shows graphs S, R and S-R respectively showing changes in a current with respect to a frequency in a state where the EML film manufactured to have excellent ML according to an embodiment of the present invention is released, a state where the EML film is stretched, and a state where the EML film is repeatedly stretched and released.

Figure 6D:
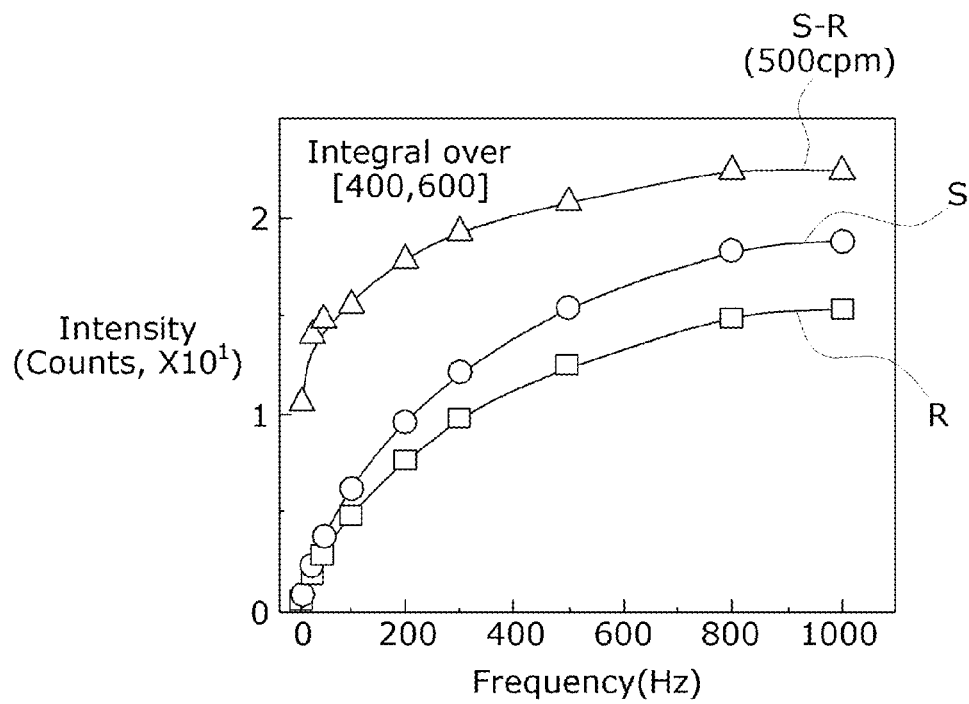

FIG. 6D shows graphs S, R and S-R respectively showing intensity changes of light with respect to a frequency in a state where the EML film manufactured to have excellent ML according to an embodiment of the present invention is released, a state where the EML film is stretched, and a state where the EML film is repeatedly stretched and released. In a structure where ML is excellent, it can be seen through the graph S-R that high light intensity is shown at a low frequency.

Figure 6E:
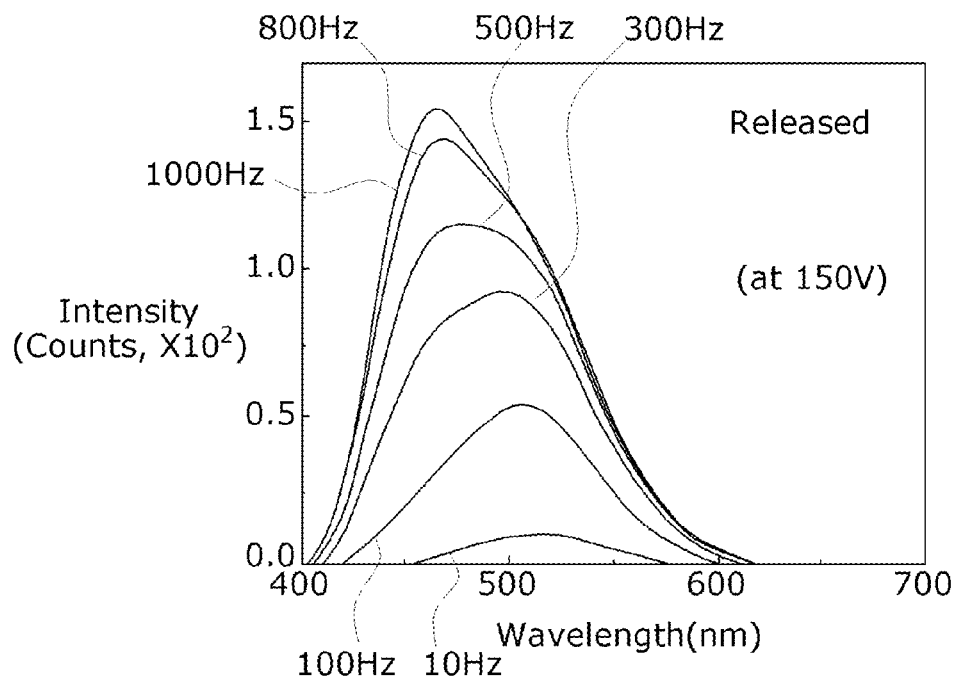
Figure 6F:
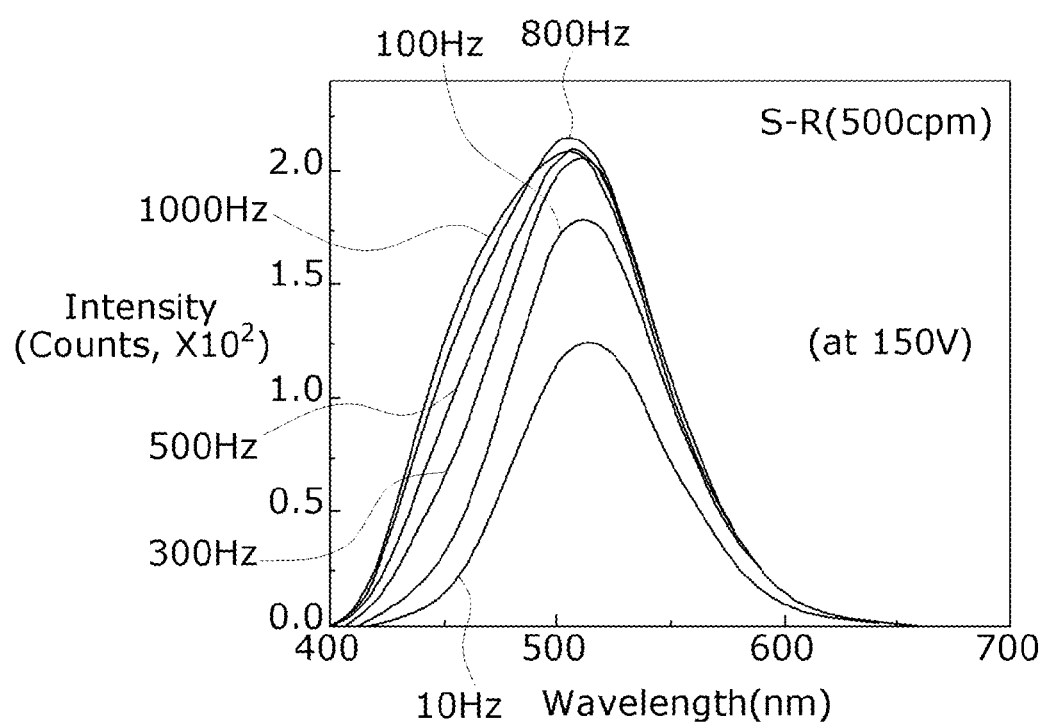

FIG. 6E shows intensity changes of light with respect to a wavelength in a state where the EML film manufactured to have excellent ML according to an embodiment of the present invention is released, and FIG. 6F shows intensity changes of light with respect to a wavelength in a state where the EML film manufactured to have excellent ML according to an embodiment of the present invention is repeatedly stretched and released.

Figure 6G:
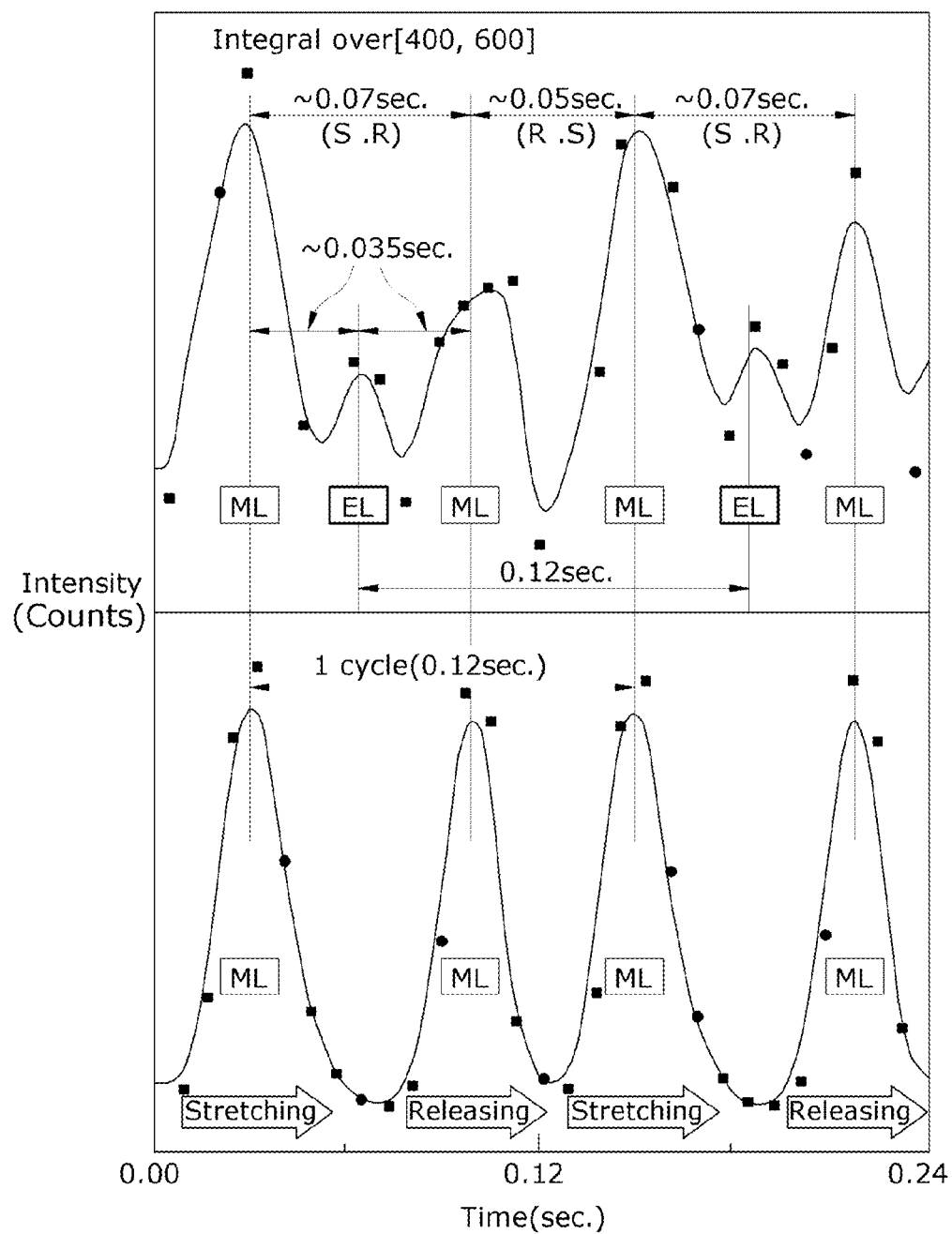

FIG. 6G shows light intensity changes of ML and EL with respect to a time. In FIG. 6G, when the EML film is stretched, ML occurs once, and when a stretched distance is the largest, EL is the maximum. Also, ML occurs once while the EML film is being released. Therefore, two ML peaks and one EL peak are observed in one cycle.

As described above, an EML film where a thickness of an emitting layer (ZnS+PDMS) is set to 90 µm shows excellent EL, and an EML film where the thickness of the emitting layer (ZnS+PDMS) is set to 150 µm shows excellent ML. Therefore, if the thickness of the emitting layer (ZnS+PDMS) is set to 125 µm close to an intermediate value between 90 µm and 150 µm, EL and ML are uniformly shown.

As described above, in an EML film manufactured to uniformly show EL and ML, when there is no mechanical deformation of the EML film, EL of blue occurs. In this case, when the EML film is repeatedly stretched and released at a velocity of 500 cpm, EL and ML appear simultaneously, and thus, light blue is seen in an AgNW electrode. For example, when the AgNW electrode is patterned in a specific shape, light blue is seen in a region where the AgNW electrode is patterned, and the AgNW electrode is not disposed in the other region except the AgNW electrode, whereby only ML of green occurs. In this case, when a frequency of an electric field applied to the AgNW electrode is lowered, the region where the AgNW electrode is patterned has green, and when only mechanical deformation is applied without applying an electric field, uniform green appears wholly. This denotes that the EML film according to an embodiment of the present invention displays different colors based on electro-deformation and mechanical deformation, and moreover, denotes that the EML film according to an embodiment of the present invention functions as a hybrid display.

As described above, the electro-mechanoluminescent composite film according to the embodiments of the present invention may express different colors by simultaneously using electro-deformation based on electrical energy and mechanical deformation based on mechanical energy such as wind, vibration, and/or the like, thereby implementing a hybrid display suitable for energy saving and environment-friendly.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electro-mechanoluminescent (EML) film comprising:
    an upper supporting layer including an upper polydimethylsiloxane (PDMS) layer, including PDMS to which a stress based on vibration count per minute is applied, and an upper electrode layer that is formed on a bottom of the upper PDMS layer and includes the PDMS and sliver nanowires (AgNW) which are mixed with each other, an electric field being applied to the AgNW;
    a lower supporting layer including a lower PDMS layer, including the PDMS, and a lower electrode layer that is formed on a top of the lower PDMS layer and includes the PDMS and the AgNW which are mixed with each other; and
    an emitting layer formed between the upper electrode layer and the lower electrode layer, the emitting layer including a mixture, where a luminescent material with metal ions doped thereon is mixed with the PDMS, and simultaneously causing mechanoluminescence (ML) of a first color based on the stress and electroluminescence (EL) of a second color based on the electric field.

2. The EML film of claim 1, wherein in the emitting layer, as the vibration count per minute increases, light intensity of the ML of the first color increases.

3. The EML film of claim 1, wherein in the emitting layer,
    as a thickness of the emitting layer becomes thicker, light intensity of the ML of the first color increases, and
    as the thickness of the emitting layer becomes thinner, light intensity of the EL of the second color increases.

4. The EML film of claim 1, wherein in the emitting layer, as a frequency of the electric field becomes higher, light intensity of the EL of the second color increases.

5. The EML film of claim 1, wherein in the emitting layer, the electric field is applied to the upper electrode layer and the lower electrode layer, and when the stress is applied to the upper PDMS layer and the lower PDMS layer, the ML of the first color and the EL of the second color based on the electric field appear simultaneously, thereby enabling an observer to see a third color where the first color is mixed with the second color.

6. The EML film of claim 1, wherein the luminescent material with the metal ions doped thereon is one of ZnS:Mn, ZnS:Cu, Mn, ZnS:Cu,Pb, ZnS:Cu,Pb, Mn, $MgF_2$:Mn, $La_2O_2S$:Eu, $Y_2O_2S$:Cu, $EuD_4TEA$, $EuD_4TEA$+1.25 mL DMMP, ZnS:Cu, Cl, ZnS:Cu, Mn, Cl, $SrAl_2O_4$:Eu, $SrAl_2O_4$:Ce, $SrAl_2O_4$:Ce,Ho, $SrMgAl_6O_{11}$:Eu, $SrCaMgSi_2O_7$:Eu, $SrBaMgSi_2O_7$:Eu, $Sr_2MgSi_2O_7$:Eu, $Ca_2MgSi_2O_7$:Eu, Dy, $CaYAl_3O_7$:Eu(Ba, Ca), $TiO_3$:$Pr_3$+, $ZnGa_2O_4$:Mn, $MgGa_2O_4$:Mn, $Ca_2Al_2SiO_7$:Ce, $ZrO_2$:Ti, ZnS:Mn, Te, and a combination thereof.

7. A method of manufacturing an electro-mechanoluminescent (EML) film, the method comprising:
(A) coating a sliver nanowires (AgNW) solution on a glass substrate by using a spin coating process, the AgNW solution including AgNW to which an electric field is applied;
(B) coating polydimethylsiloxane (PDMS), to which a stress is applied, on the AgNW solution coated on the glass substrate;
(C) curing the PDMS pressed by a mold apparatus to form an upper supporting layer, and delminating the upper supporting layer from the glass substrate, the upper supporting layer including an upper PDMS layer, including pure PDMS, and an upper electrode layer where the PDMS is mixed with the AgNW;
(D) forming a lower supporting layer including a lower PDMS layer and a lower electrode layer through a process which is the same as steps (A), (B), and (C); and
(E) curing the upper supporting layer and the lower supporting layer pressed by a pressing apparatus with a mixture, where a luminescent material with metal ions doped thereon is mixed with the PDMS, therebetween to form an emitting layer between the upper supporting layer and the lower supporting layer, the emitting layer simultaneously causing mechanoluminescence (ML) of a first color based on the stress and electroluminescence (EL) of a second color based on the electric field.

8. The method of claim 7, wherein step (C) comprises curing the PDMS pressed by the mold apparatus for 35 minutes in an atmosphere of 100° C.

9. The method of claim 7, wherein in step (E), the luminescent material with the metal ions doped thereon and the PDMS which are included in the mixture are mixed with each other at a mixing ratio of 7:3.

10. The method of claim 7, wherein step (E) comprises curing the upper supporting layer and the lower supporting layer pressed by the pressing apparatus with the mixture therebetween for 35 minutes in an atmosphere of 100° C.

11. The method of claim 7, wherein step (E) comprises determining a thickness of the emitting layer by controlling revolutions per minute (RPM) of a spin coating apparatus or controlling an interval between an upper mold and a lower mold of the mold apparatus.

12. The method of claim 7, wherein the luminescent material with the metal ions doped thereon is one of ZnS:Mn, ZnS:Cu, Mn, ZnS:Cu,Pb, ZnS:Cu,Pb, Mn, $MgF_2$:Mn, $La_2O_2S$:Eu, $Y_2O_2S$:Cu, $EuD_4TEA$, $EuD_4TEA$+1.25 mL DMMP, ZnS:Cu, Cl, ZnS:Cu, Mn, Cl, $SrAl_2O_4$:Eu, $SrAl_2O_4$:Ce, $SrAl_2O_4$:Ce,Ho, $SrMgAl_6O_{11}$:Eu, $SrCaMgSi_2O_7$:Eu, $SrBaMgSi_2O_7$:Eu, $Sr_2MgSi_2O_7$:Eu, $Ca_2MgSi_2O_7$:Eu, Dy, $CaYAl_3O_7$:Eu(Ba, Ca), $TiO_3$:$Pr_3$+, $ZnGa_2O_4$:Mn, $MgGa_2O_4$:Mn, $Ca_2Al_2SiO_7$:Ce, $ZrO_2$:Ti, ZnS:Mn, Te, and a combination thereof.

\* \* \* \* \*